W. HOOVER & E. C. GATES.
AGRICULTURAL IMPLEMENT.
APPLICATION FILED OCT. 8, 1908.
945,460.
Patented Jan. 4, 1910.
3 SHEETS—SHEET 3.
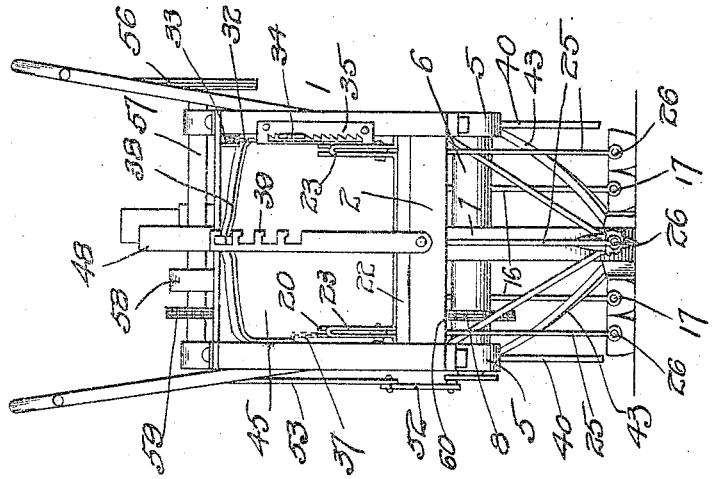
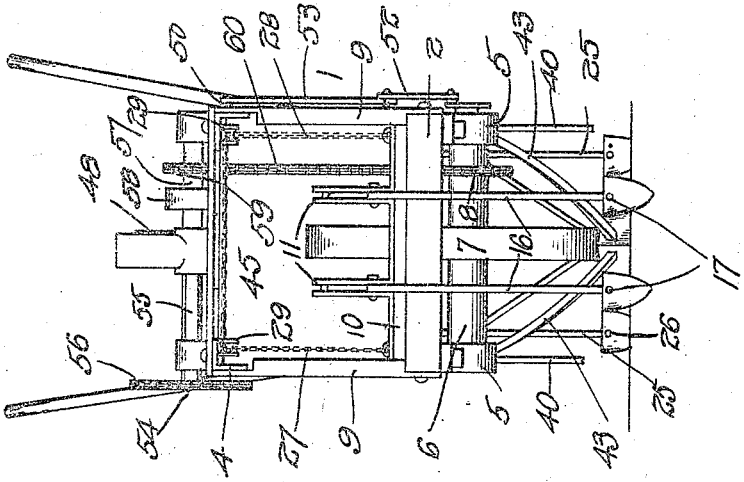
Witnesses
J. H. Miller
M. DeGrange
Inventors
W. Hoover
E. C. Gates
By D. Swift & Co.
Attorneys

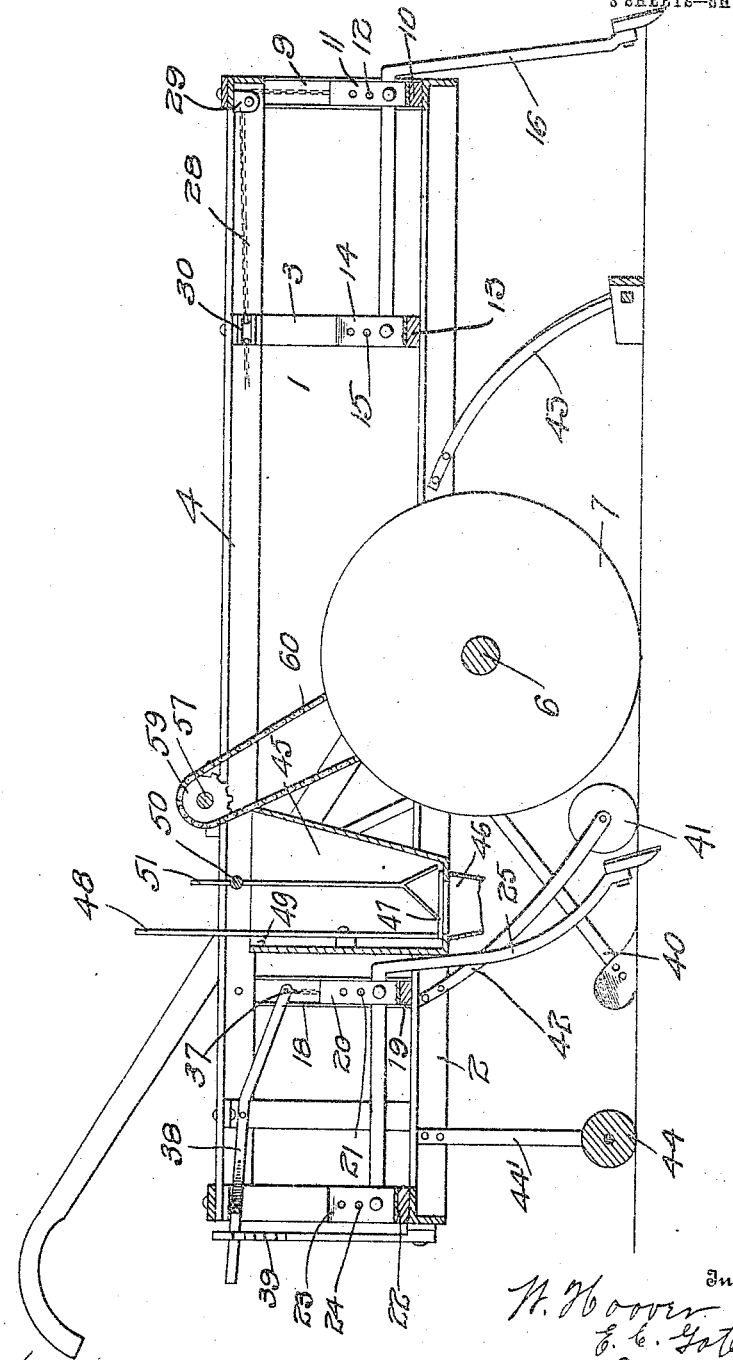

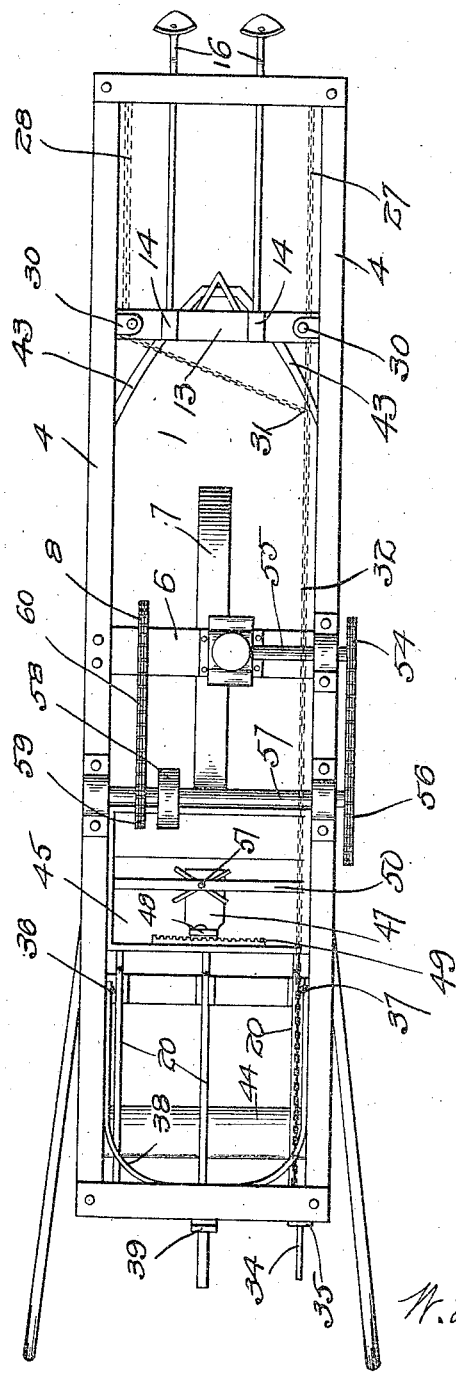

UNITED STATES PATENT OFFICE.

WILLIAM HOOVER AND EDWARD C. GATES, OF MACCLENNY, FLORIDA.

AGRICULTURAL IMPLEMENT.

945,460.	Specification of Letters Patent.	Patented Jan. 4, 1910.

Application filed October 8, 1908. Serial No. 456,845.

*To all whom it may concern:*

Be it known that we, WILLIAM HOOVER and EDWARD C. GATES, citizens of the United States, residing at Macclenny, in the county of Baker and State of Florida, have invented a new and useful Agricultural Implement; and we do hereby declare the following to be a full, clear, and exact description of the invention, such as will enable others skilled in the art to which it appertains to make and use the same.

This invention comprises the construction of an agricultural implement provided with improved driving means and with a double set of plows arranged to be vertically adjusted from the rear of the machine.

One of the objects of the invention is the provision of an agricultural implement having a forward and a rear set of plows with independent adjustment means arranged to be operated from the rear of the machine.

Another object of the invention is the provision of an agricultural implement having a forward and a rear set of plows or cultivating tools, with chain means operative from the rear of the machine for independently and vertically adjusting each set of plows or cultivating tools.

Another object of the invention is the production of an agricultural implement with a frame of angle iron and motive power means arranged on the frame and connected with the traction wheels.

With the above and other objects in view this invention comprises certain constructions, combinations, and arrangements of parts described in the specification and illustrated in the accompanying drawings, in which, Figure 1 is a central longitudinal sectional view, Fig. 2 is a top plan view, Fig. 3 is a front end view, Fig. 4 is a rear end view.

Corresponding and similar parts are referred to in the following specification and in all the views of the drawings by similar reference characters.

In the accompanying drawings we have illustrated the preferred embodiment of our invention, and it is understood that the drawings are prepared for illustrative purposes only, and are therefore not prepared to scale.

Numeral 1, designates the frame, which is preferably formed of angle iron, and comprises a base portion, 2, which is rectangular in form, a plurality of vertical bars, 3, and a top portion, 4, which is also rectangular in form. The base portion, 2, of the frame, 1, is provided with centrally disposed bearing blocks, 5, and an axle which carries a traction wheel, 7, and a sprocket wheel, 8.

The forward end of the frame, 1, is provided with vertically arranged guideways, 9, which are adapted to receive the opposite ends of a movable cross bar, 10, which is provided with adjustable plow beam supports, 11, said supports being formed with transverse openings, 12. A second cross bar, 13, is rigidly secured, on the frame, 1, and rearwardly of the cross bar, 10, and carries a plurality of inverted U-shaped plow beam supports, 14, having openings, 15, formed therein. A plurality of angular plow beams or standards, 16, having their upper ends disposed in a horizontal plane are pivotally secured to the supports 11 and 14, which are spaced apart. One end of each of the plow beams, 16, is secured in the support, 14, and the middle portion of said beam is secured in the forward support. The lower ends of the plow beams, 16, are formed with openings, 17, for accommodating plow fastening bolts.

The rear end of the frame, 1, is provided with vertical guideways, 18, which are mounted on said frame, and said guideways are adapted to accommodate opposite ends of a slidable cross bar, 19, which is provided with adjustable plow beam supports, 20, formed with openings, 21. The rear cross bar, 22, of the frame, 1, is provided with two inverted U-shaped adjustable plow beam supports, 23, which are formed with openings, 24. The rear supports pivotally sustain plow beams or standards, 26, which have their upper ends disposed in a horizontal plane, and are adapted to carry on their lower ends, which are formed with suitable bolt openings, 26, a set of plows.

The forward slidable cross bar, 10, is engaged on opposite sides by chains, 27 and 28, which engage pulleys, 29, and pass through guides, 30, arranged on the frame, 1, and said chains are connected at 31, to a rearwardly extending chain, 32. The chain, 32, passes through a guide, 33, and connects with a lever, 34, which is pivotally supported on the frame, 1, and is adapted to engage with a rack or lock, 35. When the rear end of the lever 34, is depressed the chains, 27 and 28, will elevate the slidable cross bar, 10, and the plows carried thereon. The rear slidable cross bar, 19, is connected to upwardly extending chains, 36 and 37, and a Y-shaped operating lever, 38, is connected to these chains, and is pivotally supported on the frame, 1. When depressed the lever, 38, will elevate the rear plow beams, 25, and is held in its depressed position by a rack or latch, 39, which is pivoted to the base portion, 2.

A pair of detachably secured plow beams or standards, 40, which are adapted to carry seed covering plows, are arranged on opposite sides of the base portion, 2, and project rearwardly. A drill or furrow opening wedge-disk, 41, is rotatably supported on a standard, 42, rearwardly of the traction wheel, 7. A clearer is preferably carried by a standard, 43, forwardly of the traction-wheel, 7, and a sod crusher, 44, is preferably carried by a standard, 44', rearwardly of the rear plows.

A hopper, 45, is supported on the frame, 1, rearwardly of the traction wheel, 7, and has connected thereto a drill feeding chute, 46. Communication between the chute, 46, and the hopper, 45, is controlled by a seed shut-off or slide, 47, which is carried by a lever, 48, pivotally supported on the hopper, 45, and arranged to engage a segment, 49, which is secured to the upper part of the hopper. A shaft, 50, extends across the hopper, 45, and carries a shaker or agitator, 51, and said shaft is connected to a rocking link, 52, by means of a crank arm, 53, formed thereon, with the axle or traction wheel shaft 6.

A motor, which may be of any approved type such as an internal combustion engine, comprising an explosive chamber, a fireplug, a piston and a fly wheel, is mounted on the top portion of frame, 4, and connects by means of a chain and sprocket, 54, arranged on its crank shaft, 55, with a larger sprocket wheel, 56, carried by a shaft, 57, journaled on the top portion of frame, 4, which shaft is provided with a transmission gear, 58, and an intermediate sprocket, 59, which sprocket connects by a chain, 60, the traction wheel shaft, 6. The motor is provided with the usual accessories and is adapted to propel the machine over the ground in such a manner that the operator will have nothing to do but to steer the machine and operate the motor. The frame may be provided with any number of wheels, which may be connected with the driving motor.

The forward plows are adapted to prepare the ground for the reception of seeds from the hopper, which are deposited with the assistance of a suitable drill, and the clearer is adapted to remove obstructions from the path of the traction wheel. The rear plows are arranged to finish the work of cultivation, which is assisted by the seed covering plows, and the sod crusher roller is adapted to smooth out any roughness in the ground.

What we claim and desire to secure by Letters Patent is:

1. In an agricultural implement, a frame comprising an angular bottom portion and an angular top portion, angular vertical members connected to the bottom and top portions, guideways formed on the vertical members, supports having spaced apertures therein, slidable on the guideways, angular plow beams adapted to be pivoted in either of the apertures of the supports, a chain connected with the forward support, extending rearwardly thereof, a clearer projecting forwardly secured to the frame, guideways on the rear of the frame, supports having spaced apertures movable on the guideways, an angular plow beam adapted to be pivoted in either of the apertures of said supports, seed-feeding mechanism positioned above the last plow beam and a plow beam having a plow at its lower end extending rearwardly of the lower end of the angular plow beam.

2. In an agricultural implement, a frame, a traction wheel journaled to the frame, forward plow beams carried by the frame, means for adjusting the plow beams, means extending rearwardly for elevating the plow beams, seed feeding means arranged on the frame, a clearer supported on the frame extending forwardly of the traction wheel, seed covering plows arranged rearwardly of the seed feeding mechanism, rear plow beams, means for adjustably supporting the rear-plow beams, chains for elevating the rear plow beams, and a sod roller supported on the frame.

3. In an agricultural implement, a frame, angularly disposed plow beams extending forwardly of said frame, guide posts mounted on each side of the front end of said frame, a movable cross bar carried by said frame, and each end thereof being guided by said guide posts, vertical projections rigidly connected with said movable cross bar, stationary beam supports connected with the inner ends of said beams and capable of adjusting said beams, said vertical projections being pivotally connected with said beams intermediate their ends, means for raising and lowering said movable cross bar, said plow beams having plows on their lower ends adapted to prepare the soil for the reception of seed, seed feeding mechanism arranged in the rear of said plows and a second set of plows arranged in the rear of said seed feeding mechanism for covering the seed.

In testimony whereof we have signed our names to this specification in the presence of two subscribing witnesses.

WILLIAM HOOVER.
EDWARD C. GATES.

Witnesses as to the signature of William Hoover:
I. R. RHODEN,
J. J. HODGES.

Witnesses as to the signature of Edward C. Gates:
J. PEACOCK,
R. J. CAVENS.